Patented Jan. 7, 1930

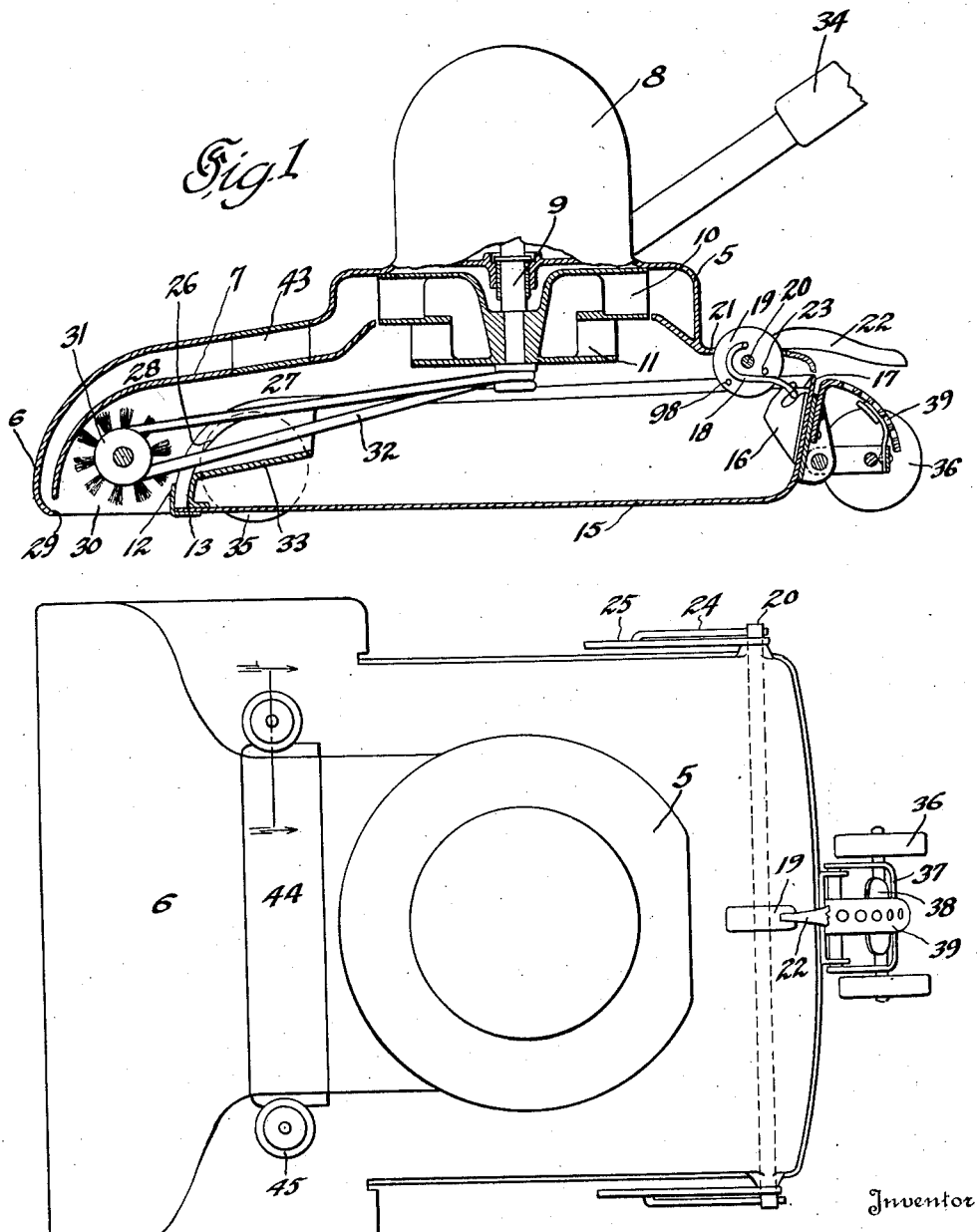

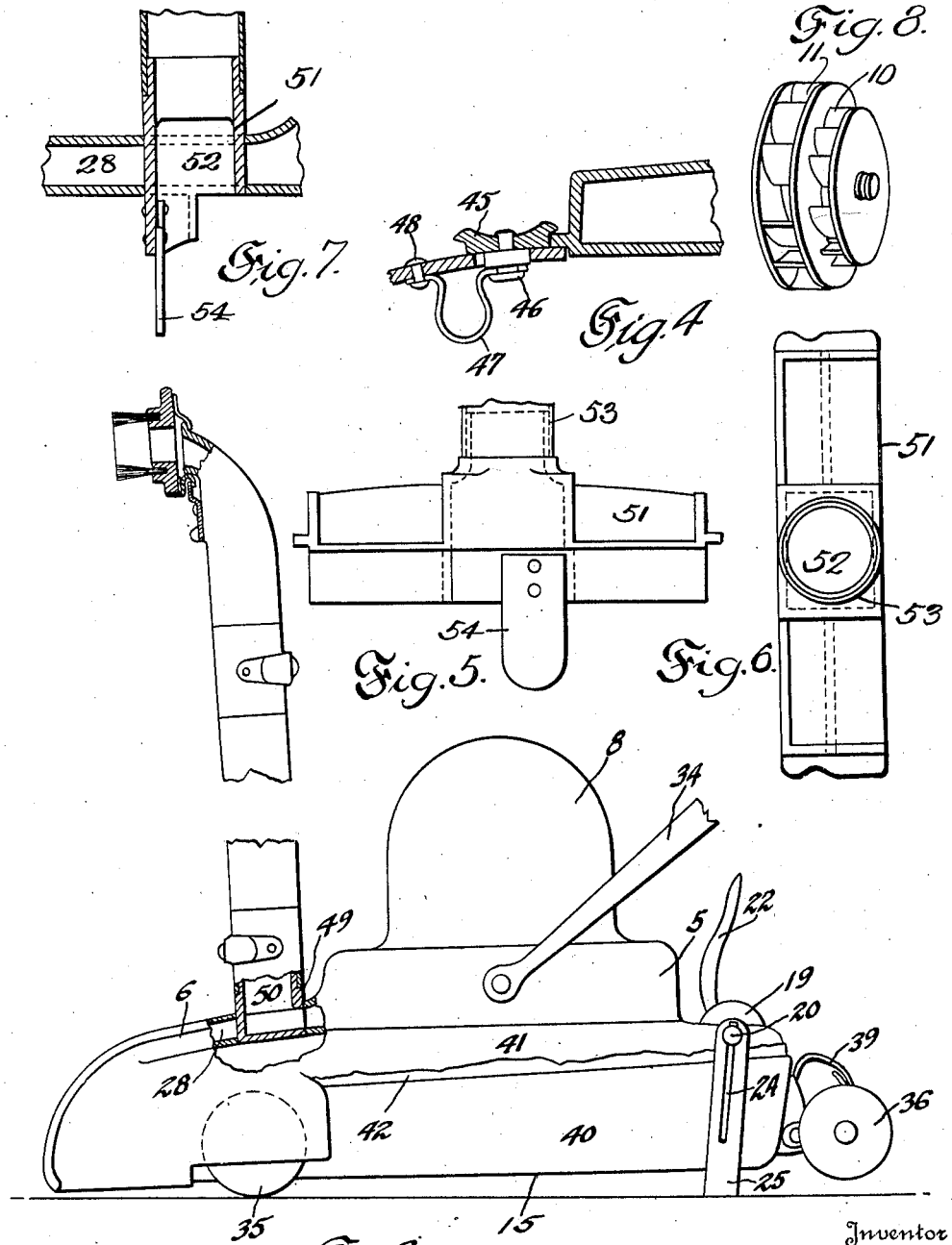

1,742,671

UNITED STATES PATENT OFFICE

JOHN SQUIRES, OF DETROIT, MICHIGAN

SEPARATOR

Application filed August 28, 1925. Serial No. 53,093.

It is the primary object of my invention to provide a separator which is adapted to cleanse air or gas and to provide in conjunction with the separation means thereof a dust pan or foreign matter receptacle into which the foreign matter will be thrown, and by which it may be removed from the separator casing.

Other and further objects of my invention are to utilize a portion of the dust pan or foreign matter receptacle as one wall of an inlet passage; to utilize the bottom of the receptacle as the bottom for the casing surrounding the separation element, and to provide the whole of a cheap and economical construction, as well as one capable of easy and quick removal of foreign matter from the casing and of neat and compact arrangement.

With the above and other objects in view, my invention consists in the arrangement, combination and construction of the various parts of my improved device as described in the specification, claimed in my claims and shown in the accompanying drawings, in which:

Fig. 1 is a sectional view showing my improved device.

Fig. 2 is a plan view showing my improved device.

Fig. 3 is a side view, shown partly in section, of a modification of my improved device.

Fig. 4 is a detail view showing a portion of the structure of my improved device.

Fig. 5 shows a fixture for my improved device.

Fig. 6 is a plan view showing a fixture of my improved device.

Fig. 7 is a detail view showing the insertion of a fixture into my improved device.

Fig. 8 is a detailed perspective view of the suction and separation device used in my construction.

I have shown my improved device in the form of a vacuum cleaner, wherein a casing composed of an upper part 5, a downwardly extending part 6, and a downwardly extending part 7 are utilized.

A conventional electric motor, indicated at 8, is mounted on the portion 5 and has a shaft 9 rotatable thereby, upon which are mounted a fan 10 and a separation element 11.

Secured on the side walls of the casing, on either side thereof, are brackets consisting of a vertical portion 12 and a horizontal portion 13. A dust pan or foreign matter receptacle 15 is disposed under the casing with the front end thereof resting upon the horizontal portion 13 of the brackets and with the rear end thereof secured to the casing by means of a hook 16 secured to the rear wall 17 of the receptacle 15, and a clasp 18. The clasp 18 is secured to a disk 19 that is mounted in the center of a shaft 20, which extends horizontally across and protrudes from both sides of the casing.

A portion of the disk 19 extends through an aperture 21, in the casing, and secured thereto is a handle 22 for partially rotating the disk 19 and the shaft 20. The disk 19 is also provided with a suitable pin 23 to aid in forcing the clasp 18 down into the hook 16, and with a pin 98 for aiding in lifting the clasp.

Suitably secured to the ends of the shaft 20 by the pins 24 are the legs 25.

The front end of the receptacle 15 is curved, as shown at 26, to conform with the inner curved portion of the part 7 of the casing, so as to combine therewith to form an inlet passage 27. The outer face of the part 7 and the inner face of the part 6 cooperate to form an air return passage 28 from the fan 10 to an outlet 29 adjacent to the intake 30 of the inlet passage 27.

Suitably positioned in the inlet passage 27 is the revolving brush 31 that is rotated by the belt 32 placed around the end of the shaft 9. A belt channel 33 is provided in the receptacle 15 to allow the passage of the belt 32.

A conventional handle 34 may be secured to the casing, as may also side wheels 35. Rear wheels, or casters 36, may be secured by an adjustable caster frame 37 to the rearward portion 17 of the foreign matter receptacle. The frame 37 has the adjuster spring 38 that can be set as desired in a notched bracket 39 positioned on the portion 17.

The tops of the side walls 40 of the foreign matter receptacle abut the ends of the side walls 41 of the casing as at 42. If desired, a rubber or other flexible lining, may be provided at the joint 42, but the suction of the fan 10 will tend to bring air in through any slight opening which may be present along this joint, rather than to throw dust or other foreign matter out therethrough.

Suitably situated in part 6 of the casing is an aperture 43 that has a cover 44 held in place by latches 45 which are secured by the studs 46 and the springs 47 that are fastened to the casing by the rivets 48.

It will be noted that the cover 44 may be removed and a blast bridge 49, having the passage 50 therein, inserted into the aperture 43 and secured by the latches 45. This bridge allows the air to pass directly through passage 50 from the air return passage 28.

A suction fixture 51, instead of the blast bridge 49, may also be inserted, as shown in Fig. 7, into the aperture 43, and secured by the latches 45. This fixture has the passage 52 therein terminating in the neck 53. When this fixture is used the passage 28 is shut off and the passage 52 is directly connected with the suction passage 27.

A baffle 54 is provided on the end of the fixture 51 so that the same, when positioned, will be in the passage 27, thereby aiding in the suction operation.

It will be obvious that in the practical operation of my improved device, it is wheeled about from place to place on the wheels 35 and 36 by pushing upon the handle 34, and that operation of the motor 8 will rotate the fan 10 and separation element 11 so as to draw air and foreign matter from the floor through the intake 30 and inlet passage 27, when it will be brought into contact with the separation element 11 with the result that the foreign matter will be thrown into the foreign matter receptacle 15 while the air will continue through the fan 10 and be returned through the passage 28, and outlet 29, to the intake point 30.

The brackets engaging the front end of the foreign matter receptacle 15 will retain that portion of the foreign matter receptacle while the hook 16 and the clasp 18 will retain the rear portion thereof and will at the same time definitely space the curved portion 26 of the receptacle from the inner wall of the part 7 of the casing.

When it is inconvenient to wheel my improved device about from place to place, the aperture 43 may be opened and either the fixture 49 or the fixture 51 may be inserted therein and connections made thereto for extending the work of my cleaner.

It will be readily seen that easy and quick removal of foreign matter from the casing may be effected by lifting the handle 22 which simultaneously sets the legs 25, thereby raising the entire rear end of the device, and also releasing the clasp 18 from the hook 16, thus permitting the receptacle 15 to be easily removed from the casing.

It will further readily be seen that the entire mechanism is of compact and neat arrangement and of economical construction.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. A separator, comprising a casing having a suction inlet passage and separating means therein, and a removable foreign matter collector also disposed therein, a portion of said collector forming at least a portion of the wall of said passage.

2. A separator comprising a casing having a separation element therein, a foreign matter collector removably positioned in said casing, said collector having an upwardly extending portion spaced from a portion of said casing and forming in combination therewith an inlet passage.

3. A separator, comprising a casing having a suction inlet passage and separating means therein, and a removable foreign matter collector also disposed therein, said collector forming a bottom for said casing, a portion of said collector forming at least a portion of the wall of said passage.

4. A separator comprising a casing having a substantially open bottom portion, brackets on the walls of said casing adjacent the bottom thereof, a foreign matter receptacle disposed under at least a portion of said casing and at least partially supported by said brackets, means for throwing foreign matter into said receptacle, and means for centering said receptacle.

5. A separator comprising a casing having a substantially open bottom portion, brackets on the walls of said casing adjacent the bottom thereof, a foreign matter receptacle disposed under at least a portion of said casing and at least partially supported by said brackets, said receptacle having a wall spaced from a portion of said casing and forming in combination therewith an inlet passage, and means for throwing foreign matter into said receptacle.

6. A separator comprising a casing having a substantially open bottom portion, brackets on the walls of said casing adjacent the bottom thereof, a foreign matter receptacle disposed under at least a portion of said casing and at least partially supported by said brackets, means for throwing foreign matter into said receptacle, and means for centering said receptacle, said means consisting of clips removably securing said receptacle to said casing.

7. In combination, a casing having a downwardly curved portion, a foreign matter receptacle in said casing and having a curved end adjacent to and cooperating with said curved portion to form an inlet passage, means for separating foreign matter and air and disposing said foreign matter in said receptacle.

8. A separator, comprising a casing having a separation element therein, a foreign matter collector removably positioned in said casing, adjustable means on the end of said collector for moving the separator, and means adapted to lift the rear end thereof.

9. A separator, comprising a casing having a separation element therein, a removable foreign matter collector forming a bottom for said casing and an adjustable bracket secured to the back of said collector having casters positioned therein.

10. A separator comprising a casing having a substantially open bottom portion, brackets on the walls of said casing adjacent the bottom thereof, a foreign matter receptacle disposed under at least a portion of said casing and partially supported by said brackets, means for throwing foreign matter into said receptacle and means for centering said receptacle consisting of a clasp secured to said casing and a clasp hook on said collector for removably securing the same to said casing.

11. A separator comprising a casing having a substantially open bottom portion, brackets on the walls of said casing adjacent the bottom thereof, a foreign matter receptacle disposed under at least a portion of said casing and partially supported by said brackets, means for throwing foreign matter into said receptacle and means for centering said receptacle consisting of a disk having a handle thereon secured to said casing, a clasp fitted into said disk and a tapered hook on said receptacle adapted to receive said clasp, thereby removably securing said receptacle to said casing.

12. A separator comprising a casing having a suction inlet passage and separating means therein, a foreign matter receptacle also positioned therein, legs on the side of said casing and means adapted to removably secure said receptacle to said casing and simultaneously adjust the legs on the side of said casing.

13. A separator comprising a casing having a separation element therein, a foreign matter receptacle disposed under at least a portion of said casing, and means for removably securing said receptacle to said casing, consisting of a shaft having a disk in the center thereof positioned in said casing, a handle on said disk and a clasp secured thereto, a hook on said receptacle adapted to receive said clasp and a pair of legs on the end of said shaft outside of said casing, said legs being lowered by the shaft when said clasp is unhooked thereby permitting said receptacle to be easily removed from said casing.

14. In combination a separator comprising a casing having a separating means therein, said casing having an aperture therein and a removable foreign matter collector disposed in the bottom of said casing, a blast bridge adapted to fit into said aperture and means for securing said bridge to said casing.

15. In combination, a separator comprising a casing having a separation element therein, said casing having an aperture therein, and a removable foreign matter receptacle disposed in the bottom of said casing, a blast bridge having a neck thereon adapted to be inserted in said aperture and means for securing said bridge to said casing.

JOHN SQUIRES.